under 35 U.S.C. 154(b) by 0 days.

United States Patent
Park et al.

(10) Patent No.: US 9,538,363 B2
(45) Date of Patent: Jan. 3, 2017

(54) USER TERMINAL APPARATUS, SERVER, AND METHOD OF PROVIDING A CUSTOMIZED SERVICE

(71) Applicant: Samsung Electronics Co., Ltd, Suwon-si, Gyeonggi-do (KR)

(72) Inventors: Soo-hong Park, Yongin-si (KR); Sun-hee Youm, Suwon-si (KR); In-chul Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/295,605

(22) Filed: Jun. 4, 2014

(65) Prior Publication Data

US 2014/0370859 A1  Dec. 18, 2014

(30) Foreign Application Priority Data

Jun. 12, 2013  (KR) .................. 10-2013-0067368

(51) Int. Cl.
  *H04W 8/18*  (2009.01)
  *H04W 4/00*  (2009.01)
  *G06Q 30/06*  (2012.01)

(52) U.S. Cl.
  CPC ......... *H04W 8/183* (2013.01); *G06Q 30/0631* (2013.01); *H04W 4/001* (2013.01)

(58) Field of Classification Search
  CPC .... G06Q 30/0631; H04W 4/001; H04W 8/183
  USPC .... 455/414.1; 705/10, 14, 26; 709/245, 219, 709/217
  See application file for complete search history.

(56) References Cited

U.S. PATENT DOCUMENTS

| 7,578,436 B1* | 8/2009 | Kiliccote ...................... 235/380 |
| 2002/0107792 A1* | 8/2002 | Anderson ............. G06Q 10/10 705/40 |
| 2002/0133374 A1* | 9/2002 | Agoni ................... G06Q 10/10 705/2 |
| 2007/0101433 A1* | 5/2007 | Louch .................. G06F 21/552 726/25 |
| 2009/0171760 A1* | 7/2009 | Aarnio et al. .................. 705/10 |
| 2013/0073371 A1* | 3/2013 | Bosworth ............. G06Q 30/02 705/14.35 |
| 2013/0346357 A1* | 12/2013 | Motahari .............. G06F 21/577 706/52 |
| 2014/0024348 A1* | 1/2014 | Hurst .................. H04M 3/5232 455/414.1 |

FOREIGN PATENT DOCUMENTS

| KR | 2002-0028297 | 4/2002 |
| KR | 2010-0008893 | 1/2010 |

\* cited by examiner

*Primary Examiner* — Qun Shen
(74) *Attorney, Agent, or Firm* — Staas & Halsey LLP (57) ABSTRACT

A user terminal apparatus includes a storage to store use log information on the user terminal apparatus, a communicator, when an event to receive a service from an external apparatus occurs, to transmit use log information required to provide the service to the external apparatus selectively, and a controller to receive a service generated based on the transmitted use log information and customized to the user from the external apparatus.

12 Claims, 10 Drawing Sheets

USER TERMINAL APPARATUS, SERVER, AND METHOD OF PROVIDING A CUSTOMIZED SERVICE

CROSS-REFERENCE TO RELATED APPLICATIONS

This application claims priority under 35 U.S.C. §119 from Korean Patent Application No. 10-2013-0067368, filed on Jun. 12, 2013 in the Korean Intellectual Property Office, the disclosure of which is incorporated herein by reference in its entirety.

BACKGROUND OF THE INVENTION

1. Field of the Invention

The present general inventive concept generally relates to a user customized service, and more particularly, to a user terminal apparatus to provide a service customized to a user by analyzing use log information on the user terminal apparatus, a server, and a method of providing a customized service.

2. Description of the Related Art

Recently, a technology of providing a user customized service through a user terminal apparatus has been developed. The user customized service refers to a service of analyzing characteristic of a user, determining interest and necessity of the user, and providing the user with personalized information based on the analysis. For example, there is a service of analyzing an online product purchase history of a user, determining preference of the user, and providing a user terminal apparatus with information on a new product.

However, in the user customized services in the related art, it is required to log in a service providing server in order to receive a service on a user terminal apparatus since the service providing server has information to analyze a user's interest and necessity. That is, when a user terminal apparatus for using a service appears, the service providing server should identify a user first since the server uses user information stored therein, such as the user's service use history information or profile, in order to analyze the characteristic of the user.

Figure 1:
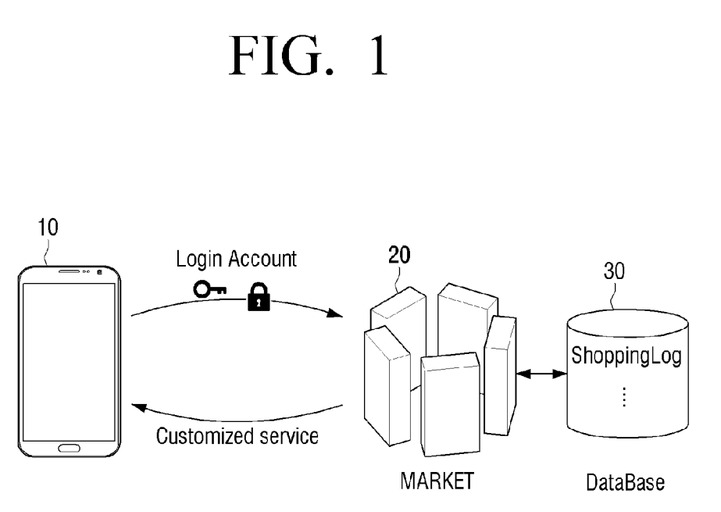
FIG. 1 is a mimetic diagram illustrating a configuration of a system of a customized online shopping mall service in the related art.

FIG. 1 is a mimetic diagram illustrating a configuration of a system of a customized online shopping mall service in the related art.

As illustrated in FIG. 1, a log-in operation to a server 20 is required to receive a customized online service through a smart phone 10. When the log-in operation is performed, the server 20 identifies a user, and reads the user's shopping information and personal information and the like from a database 30. In addition, the server 20 analyzes the user's interest and necessity based on the read information, and provides the user with a corresponding service. For example, the server 20 may provide a smart phone 10 with information on a product that might appeal to the user.

However, the log-in operation may cause inconvenience to a user and a risk of leaking an ID or a password, thereby decreasing security. In addition, if the user is not registered at the service, the user should register at the service as a member in advance in order to receive customized information. Further, such process may delay the service.

In particular, the methods in the related art have a privacy issue since the service providing service keeps information for analyzing the user characteristic. The information to analyze the user characteristic may be often leaked, and may be used by unwanted service providers. In addition, such privacy weakness remains as an obstacle to popularization of a user customized service.

Accordingly, there is a need for developing a method of providing a user customized service on a user terminal apparatus without the log-in operation while reducing the risk of privacy invasion.

SUMMARY OF THE INVENTION

The present general inventive concept relates to a user terminal apparatus to provide a user customized service on the user terminal apparatus conveniently without the log-in operation while reducing the risk of privacy invasion, a server, and a method of providing a customized service.

Additional features and utilities of the present general inventive concept will be set forth in part in the description which follows and, in part, will be obvious from the description, or may be learned by practice of the general inventive concept.

The foregoing and/or other features and utilities of the present general inventive concept are achieved by providing a user terminal apparatus including a storage to store use log information on the user terminal apparatus, a communicator, when an event to receive a service from an external apparatus occurs, to transmit use log information required to provide the service to the external apparatus selectively, and a controller to receive a service generated based on the transmitted use log information and customized to a user from the external apparatus.

Herein, the use log information may be at least one of web page visit history information, item select information, application use information, content download information, item purchase history information, and translocation information on the user terminal apparatus.

When a user input is received, the controller may control to transmit use log information required to provide the service to the external apparatus selectively based on the received user input.

In addition, the controller may control to further transmit user information indicating a user characteristic to the external apparatus, and receive and output a service generated based on the transmitted user information and use log information and customized to the user.

Herein, the use log information may be user's product purchase history information. In addition, the controller may control to receive a product service generated based on the product purchase history information and customized to the user from an online shopping mall.

Meanwhile, the use log information may be user's content view information. In addition, the controller may control to receive a content providing service generated based on the content view information and customized to the user from a content service server.

The foregoing and/or other features and utilities of the present general inventive concept may also be achieved by providing a server including a communicator, when it is required to provide a service to a user terminal apparatus, to receive use log information required to provide the service from the user terminal apparatus and a controller to control to generate information customized for a user based on the received use log information, and provide a service to the user terminal apparatus by using the generated customized information.

The controller may control to further receive user information indicating user characteristic from the user terminal apparatus, generate information customized to the user based on the received user information and the use log information, and provide a service to the user terminal apparatus by using the generated customized information.

At this point, the user terminal apparatus may be one of a plurality of user terminal apparatuses included in a private cloud. In addition, the controller may control to receive use log information on another user terminal apparatus included in the private cloud from the user terminal apparatus, generate information customized to the user based on the received use log information, and provide a service to the user terminal apparatus by using the generated customized information.

The use log information may be user's product purchase history information. In addition, the controller may control to provide a product service customized to the user to the user terminal apparatus based on the product purchase history information.

The foregoing and/or other features and utilities of the present general inventive concept may also be achieved by providing a method of providing a customized service according to an exemplary embodiment includes storing use log information on a user terminal apparatus, when an event to receive a service from an external apparatus occurs, transmitting use log information required to provide the service to the external apparatus selectively, and receiving a service generated based on the transmitted use log information and customized to the user from the external apparatus.

The use log information may be at least one of web page visit history information, item select information, application use information, content download information, item purchase history information, and translocation information on the user terminal apparatus.

The transmitting the use log information to the external apparatus selectively may include, when a user input is received, transmitting use log information required to provide the service to the external apparatus selectively based on the received user input.

In addition, the aforementioned method may further include transmitting user information indicating user characteristic to the external apparatus (not depicted). In addition, the receiving a service customized to the user may include receiving and outputting a service generated based on the provided user information and the use log information and customized to the user.

The use log information may be user's product purchase history information. In addition, the receiving a service customized to the user may include receiving a product service generated based on the product purchase history information and customized to the user from an online shopping mall.

The use log information may be user's content view information. In addition, the receiving a service customized to the user may include receiving a content providing service generated based on the content view information and customized to the user from a content service server.

The foregoing and/or other features and utilities of the present general inventive concept may also be achieved by providing a method of providing a customized service such that when it is required to provide a service to a user terminal apparatus, requesting to receive use log information to the user terminal apparatus and receiving use log information required to provide the service from the user terminal apparatus, and generating information customized to a user based on the received use log information, and providing a service to the user terminal apparatus using the generated use log information.

The method may further include receiving user information indicating user characteristic from the user terminal apparatus. In addition, the providing a service to the user terminal apparatus may include generating information customized to the user based on the received user information and the use log information, and providing a service to the user terminal apparatus using the generated customized information.

The use log information may be user's product purchase history information. In addition, the providing a service to the user terminal apparatus may include providing a product service customized to the user to the user terminal apparatus based on the product purchase history information.

The foregoing and/or other features and utilities of the present general inventive concept may also be achieved by providing a method of providing a customized service including storing use log information by a user terminal apparatus and requesting for use log information required to provide a service to the user terminal apparatus by a server. In addition, the user terminal apparatus transmits use log information required to provide the service to the server selectively. The server generates information customized to a user based on the received use log information, and provides the service to the user terminal apparatus using the generated customized information.

The foregoing and/or other features and utilities of the present general inventive concept may also be achieved by providing a user terminal apparatus, including a communicator to request to receive a service from an external apparatus and to selectively transmit use log information of the user terminal apparatus to the external apparatus in response to the request, and a controller to analyze the request in order to select which use log information corresponds correctly to the requested service in order to transmit the correct use log information from the communicator to the external apparatus, such that the requested service is received from the external apparatus.

The user terminal apparatus may further include a storage to store at least one of the use log information and any metadata resulting from at least one of analysis, processing, alignment, and inference of the request.

The use log information may include at least one of web page visit history information, item select information, application use information, content download information, item purchase history information, and translocation information on the user terminal apparatus.

The user terminal apparatus may further include a user interface to display a selection menu based on the use log information to allow a user to select information to be provided to the external apparatus.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
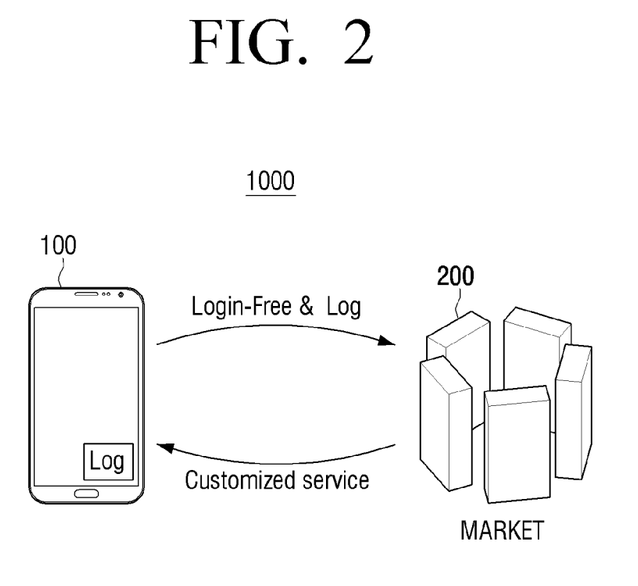
FIG. 2 is a mimetic diagram illustrating a system to provide a service customized to a user according to an exemplary embodiment of the present general inventive concept.

FIG. 2 is a mimetic diagram illustrating a system to provide a service customized to a user according to an exemplary embodiment of the present general inventive concept.

As illustrated in FIG. 2, in a system 1000 according to an exemplary embodiment of the present general inventive concept, a user terminal apparatus 100 stores shopping information and personal information associated with a user to provide a service customized to the user in the user terminal apparatus 100. The shopping information is log information regarding a user's details of use of an online shopping service provided by a server 200, and the information is generally recorded and managed by the user terminal apparatus 100 without any active manipulation of a user. In contrast, the personal information refers to information that is actively input by a user, such as the user's sex, interest, age, residence, education, occupation, preference, a location of workplace, car ownership, and favorite sports, etc., but is not limited thereto.

In the present exemplary embodiment of the present general inventive concept, the user terminal apparatus 100 is not required to log in to the server 200 in order to receive a service via the server 200. That is, when the user terminal apparatus 100 requests a service, the server 200 simply requests to receive the aforementioned shopping information, personal information, etc., from the user terminal apparatus 100. When an input to permit the aforementioned information to be provided to the server 200 is received (e.g., the input is performed by a user), the user terminal apparatus 100 provides the aforementioned information to the server 200. The server 200 analyzes a user's interest and necessity based on the provided information, and provides a user customized service that is specifically customized to correspond to the user terminal apparatus 100. As illustrated in FIG. 2, the server 200 recommends an online product that might appeal to a user or transmits price comparison information to the user terminal apparatus 100. The server 200 may store the transmitted information while the service is provided, but when it is finished, the server 200 discards the information unless the user wants the server to keep the information.

Figure 3:
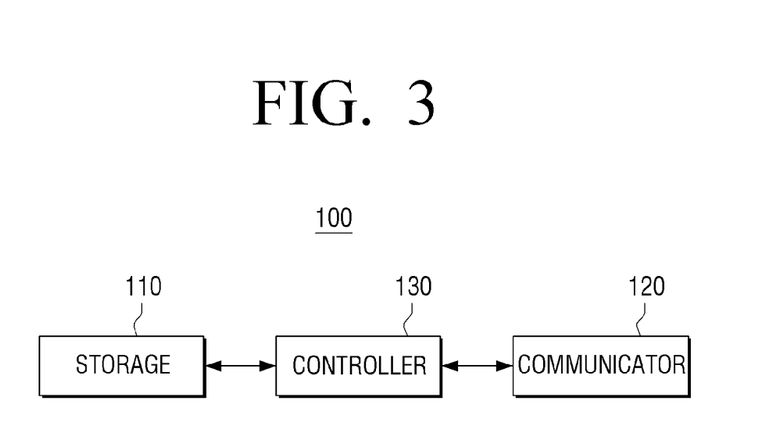
FIG. 3 is a block diagram illustrating a configuration of a user terminal apparatus according to an exemplary embodiment of the present general inventive concept.

FIG. 3 is a block diagram illustrating a configuration of the user terminal apparatus 100 according to an exemplary embodiment of the present general inventive concept.

Referring to FIG. 3, the user terminal apparatus 100 according to an exemplary embodiment of the present general inventive concept includes a storage 110, a controller 130, and a communicator 120.

The storage 110 may store use log information on the user terminal apparatus 100. The use log information refers to information including a history of the user terminal apparatus 100 regarding the operations of receiving a service. For example, the use log information may be at least one of web page visit history information, item select information, application use information, content download information, item purchase history information, and translocation information on the user terminal apparatus, but is not limited thereto.

When a user visits a web page, a web browser (not illustrated) of the user terminal apparatus 100 may store a visit history. The visit history may be stored together with a visit date and time. The web browser or the controller 130, which will be described below, executes at least one of analysis, processing, alignment, and inference to the stored visit history, and generates and stores necessary metadata in the storage 110. The stored data may be used as a query to search a database by the server 200.

The item select information refers to information regarding an item selected by a user. The item select information may be stored, managed, and used as use log information in a manner similar to the aforementioned web page visit history information.

In addition, application use information may be stored in the storage 110. The application use information refers to various information related to installation and execution of an application, such as information corresponding to a downloaded application, search information corresponding to an application, frequency of an application execution, execution time, execution place (i.e., location information) etc., but is not limited thereto. The user terminal apparatus 100 executes at least one of the analysis, processing, alignment, and inference to the stored application use information, and generates and stores necessary metadata in the storage 110. The stored data may be used as a query to search a database by the server 200.

Content download information refers to information regarding content downloaded through an Application (App) store or information regarding content executed in the user terminal apparatus 100. For example, the content download information may include a downloaded or executed MP3 file, a moving image file, a game file, a picture file, information on online ticket advance sale, etc., but is not limited thereto. The user terminal apparatus 100 executes at least one of the analysis, processing, alignment, and inference to the content download information, and generates and stores necessary metadata in the storage 110 as information based on the user's interest or necessity. The stored data may be used as a query to search a database by the server 200.

Item purchase history refers to information related to an item that a user actually purchased, after searching or reserving the same. It can be seen that an item that a user actually purchases is an item in which the user is highly interested or an item that the user needs most, and thus information on the item that a user actually purchases may be meaningful. The user terminal apparatus 100 executes at least one of the analysis, processing, alignment, and inference to a mobile payment history, and generates and stores necessary metadata as data regarding the user's interest or necessity. Similarly, the stored data may be used a query to search database by the server 200.

According to the needs, location information on the user terminal apparatus 100 may be used adjunctively. When use log information is considered with the location information on the user terminal apparatus 100, that is, location information on a user, the user's interest and necessity may be determined more accurately. For example, when the user uses an application or downloads contents in a particular location, the location information may be essential to determine the user's interest and necessity accurately. In this case, the controller 130 executes the aforementioned analysis, processing, alignment, and inference by further considering the location information on the user terminal apparatus 100.

The location information on the user terminal apparatus 100 may be determined by using various positioning methods. For example, various positioning methods such as a cell method using a mobile communication base station, a GPS method using a global positioning system, and a method using a local area communication technology like Wi-Fi may be used. In this case, the user terminal apparatus 100 may include at least one of a mobile communication module, a local area communication module, and a GPS module according to an implementation technology.

Meanwhile, as a period of use of the user terminal apparatus 100 increases, the use log information is continuously accumulated, which may cause a problem regarding inconsistent information. For example, when a user's address information is changed due to a move, information inconsistent with existing information may be generated. In this case, the user terminal apparatus 100 may enable the user to select a right address, or may replace the existing information with most recent information.

The storage 110 may be realized as various technical means. For example, the storage 110 may include a memory such as a ROM or a RAM, a HDD (Hard Disk Drive), and a BD (Blu-ray Disk) etc., but is not limited thereto. A non-volatile memory such as an EEPROM (Electrically Erasable and Programmable ROM) or a non-volatile RAM may be used, but not limited to, and a volatile memory such as a static RAM or a dynamic RAM may be used. A HDD may include a compact hard disk smaller than 1.8 inches that is mountable on the user terminal apparatus 100.

When an event to receive a service from an external apparatus (e.g., the server 200) occurs, the communicator 120 transmits use log information required to provide the service to the external apparatus selectively. When a user wishes to receive a service from a particular server 200, the user accesses to the server 200 through the user terminal apparatus 100. The communicator 120 transmits a service request to the server 200. When the service is available, the server 200 sends a response message. When the server is required to provide a service customized to the user, the server 200 sends a request to receive necessary information from the user terminal apparatus 100.

The user terminal apparatus 100 may decide information to be provided to the server 200 autonomously. Or, the user terminal apparatus 100 may control to display a selection menu so that the user is able to select information to be provided to himself. The information to be provided is based on the aforementioned use log information. As a result, the communicator 120 transmits use log information required to provide a service to the server 200 selectively.

In a modified exemplary embodiment of the present general inventive concept, the user terminal apparatus 100 may set a grade of use log information according to degree of possibility of the privacy invasion. For example, a first grade information refers to information having a highest possibility of the privacy invasion, and may include a user's name, annual income, full address, telephone number, etc., but is not limited thereto. Information having a possibility of the privacy invasion lower than the first grade information may include a user's hobby, model of car, age, etc., but is not limited thereto. The controller 130 may control to display the selection menu so that the user is able to select information to be provided to the server 200 based on the grades.

The communicator 120 may be realized as various communication technologies. Mainly, the communicator 120 may include a local area communication module. In this case, the user terminal apparatus 100 may receive a service from the server 200 on the Internet by being connected to a relay equipment through the local area communication module.

For example, the communicator 120 may follow Wi-Fi communication standard. A Wi-Fi module performs local area communication under IEEE 802.11 technical standard. According to the IEEE 802.11 technical standard, a wireless communication technology in a band spreading method referred to as Single Carrier Direct Sequence Spectrum (DSSS) and a wireless communication technology in an orthogonal frequency division method referred to as Multi Carrier Orthogonal Frequency Multiplexing (OFDM) are used.

In another exemplary embodiment of the present general inventive concept, the communicator 120 may be realized as various mobile communication technologies. That is, the communicator 120 may include a cellular communication module capable of transmitting and receiving data by using existing wireless telephone network. For example, 3-Generation (3G) mobile communication technology may be applied. That is, at least one of Wideband CDMA (WCDMA), High Speed Downlink Packet Access (HSDPA), High Speed Uplink Packet Access (HSUPA) and High Speed Packet Access (HSPA) may be used.

Alternatively, 4-Generation (4G) mobile communication technology may be applied. 2.3 GHZ (portable Internet) Mobile WiMAX or WiBro is an Internet technology, which is usable when moving at high speed.

In addition, 4G Long Term Evolution (LTE) technology may be applied. LTE is an extended technology of WCDMA, and is based on Orthogonal Frequency Division Multiple Access (OFDMA) and Multiple-Input Multiple-Output (MIMO) technologies. LTE has an advantage of using the existing network since it is based on WCDMA technology.

As given above, although WiMAX, Wi-Fi, 3G, and LTE having a broad bandwidth and high efficiency may be used, it cannot be seen that there is large amount of data traffic in an exemplary embodiment, and thus more effective technology may be used. That is, local area communication modules including a Bluetooth module, a IrDA (Infrared Data Association) module, a Near Field Communication (NFC) module, and a Zigbee module and a wireless LAN module may be applied.

The controller 130 is a configuration that controls overall operations of the user terminal apparatus 100. The controller 130 includes hardware configurations such as a Micro Processing Unit (MPU) or a Central Processing Unit (CPU), a cache memory, and a data bus and software configurations such as an operating system and an application executing a particular purpose. According to a system clock, a control command to operate the user terminal apparatus 100 with respect to each component is read from a memory, and operates each component by generating an electronic signal according to the read control command.

Specially, the controller 130 controls to receive a service generated based on the transmitted use log information and customized to the user from the server 200. The controller 130 controls to receive the customized service from the server 200, and to output the received service information.

As described above, the configurations and functions of the user terminal apparatus 100 according to various exemplary embodiments of the present general inventive concept were described. The aforementioned user terminal apparatus 100 may be realized as various mobile apparatuses. For example, the user terminal apparatus may be realized as at least one of a smart phone, a tablet personal computer (PC), a smart watch, a smart eyeglasses, a portable media player (PMP), an MP3 player, a personal data assistant (PDA), a cell phone, a laptop computer, and other movable terminal apparatuses that are known to one of ordinary skill in the art.

In addition, the user terminal apparatus 100 may include essential configurations of a conventional electronic calculator. That is, the user terminal apparatus 100 includes a CPU having sufficient control ability and computing power, a cache memory, a RAM memory, an auxiliary high-capacity memory such as a hard disk or a Blu-Ray disk, an input/output device acting as a user interface, such as a touch screen, a local area communication module, various wire/wireless communication modules including a HDMI, and a hardware configuration such as a data bus, and includes an application capable of performing a function of the aforementioned controller 130, a framework, and an operating system.

Hereinafter, configurations and operations of the server 200 according to various exemplary embodiments of the present general inventive concept will be described.

Figure 4:
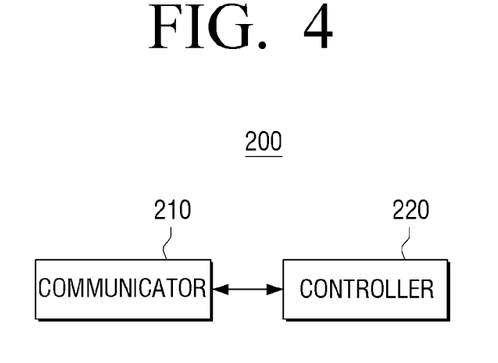
FIG. 4 is a block diagram illustrating a configuration of a server according to an exemplary embodiment of the present general inventive concept.

FIG. 4 is a block diagram illustrating a configuration of the server 200 according to an exemplary embodiment of the present general inventive concept.

Referring to FIG. 4, the server 200 according to an exemplary embodiment of the present general inventive concept includes a communicator 210 and a controller 220.

When it is required to provide a service to the user terminal apparatus 100, the communicator 210 receives use log information required to provide the service from the user terminal apparatus 100. As described above, the use log information refers to information including a history of the user terminal apparatus 100 regarding the operations to receive a service. The description regarding the use log information will be omitted since it was already described above.

The communicator 210 may be realized as various technical means. The communicator 210 may be realized as the aforementioned local area communication means and mobile communication means, but when the server 200 provides a service by being connected to the Internet, it may follow TCP/IP, a standard protocol to transmit information on the Internet. As it is well known, TCP is regulations regarding a technology of dividing and packing data into a certain unit, and IP is regulations regarding a technology of transmitting and receiving data directly.

The controller 220 is a configuration that controls overall operations of the server 200. Particularly, the controller 220 controls to generate information customized to a user based on the received use log information, and provide a service to the user terminal apparatus 100 by using the generated customized information.

The controller 220 generates information customized to correspond to the user based on the received use log information. The server 200 includes a database to provide a service. The database is categorized according to the user's necessity and interest, and may search a series of service data by using the use log information as a query.

For example, the server 200 may search the database based on the user's interest information, and may read information regarding a product that the user might need. In addition, the server 200 may process and provide the information to the user terminal apparatus 100.

There is no limit in methods of realizing a database. That is, the database may be one of a Hierarchical Database (HDB), a Relational Database (RDB), and an Object-Oriented Database (OODB). When a database is built in a separate server, the database may be realized as a Network Database (NDB) as well as the aforementioned types of database.

In addition, the database may be realized as a cloud. The cloud is not limited to a particular form, and may be realized as any one of a private cloud and a public cloud.

As given above, the configurations and operations of the server 200 according to various exemplary embodiments of the present general inventive concept were described. The aforementioned server 200 may be realized as at least one high-performance main frame computer capable of processing big data or a workstation. The server 200 includes general configurations of a similar type of electronic calculator. That is, the server 200 includes at least one CPU having sufficient control ability and computing power, a high-capacity cache memory, a RAM memory, an auxiliary high-capacity memory such as a hard disk or a Blu-Ray disk, an input/output device such as a keyboard, a monitor, and a touch screen, a communication module, various wire/wireless communication modules including a HDMI, and a hardware configuration such as a data bus, and includes an application capable of performing a function of the aforementioned controller 130, a framework, and an operating system, but is not limited thereto.

Hereinafter, some scenarios that the aforementioned user terminal apparatus 100 and the server 200 provide a service customized to a user will be described.

Figure 5:
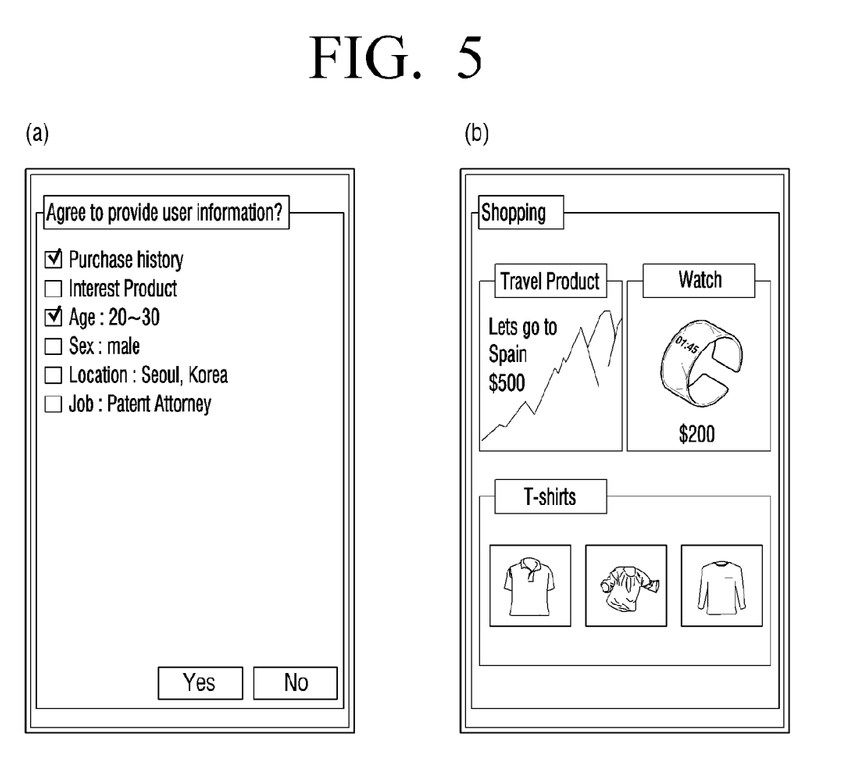
FIG. 5 is a view illustrating a screen of a user terminal apparatus in an online shopping mall scenario according to an exemplary embodiment of the present general inventive concept.

FIG. 5 is a view illustrating a screen of a user terminal apparatus in an online shopping mall scenario according to an exemplary embodiment of the present general inventive concept.

In the exemplary embodiment of FIG. 5, the user terminal apparatus 100 connects to an online shopping mall provided by the server 200, and requests to receive a service customized to a user to the server 200. At this point, a log-in operation to the server 200 is not required by the user terminal apparatus 100 in order to receive the customized service from the server 200.

Instead, the server 200 requests to receive use log information to the user terminal apparatus 100 when the user terminal apparatus 100 requests to receive a service. The user terminal apparatus 100 stores a history that a user purchased a product through an online shopping mall and information on a product that is determined as an interest product since the user puts it in a shopping cart as use log information. In addition, the user's age (e.g., the twenties-thirties), sex (male), residence (e.g., Seoul, Korea), and an occupation (e.g., a patent attorney) inputted by the user may be provided as user information.

The user terminal apparatus 100 may provide use log information and user information to the server 200 selectively, and may display a selection menu so that the user is able to select information that the user wishes to open to a service provider as illustrated in FIG. 5. In view (a) of FIG. 5, which may include a user interface, the user selects the check boxes corresponding to purchase history and age only. Accordingly, the user terminal apparatus 100 provides only the selected information to the server 200.

The server 200 searches a product database by using the purchase history and the age as a query. As seen in view (b) of FIG. 5, an online shopping mall screen is configured to include any products that the user has purchased, such as a travel product, a watch, clothes, etc., and the user's age is in the range of twenties to thirties. That is, considering a color, a price, etc. of the product that the user purchased, a product that might appeal to the user or that may be needed by the user is searched, and a screen of an online shopping mall is configured to be centered around the searched product. As such, the online shopping mall is, in essence, automatically customized to the user's needs and/or preferences.

Figure 6:
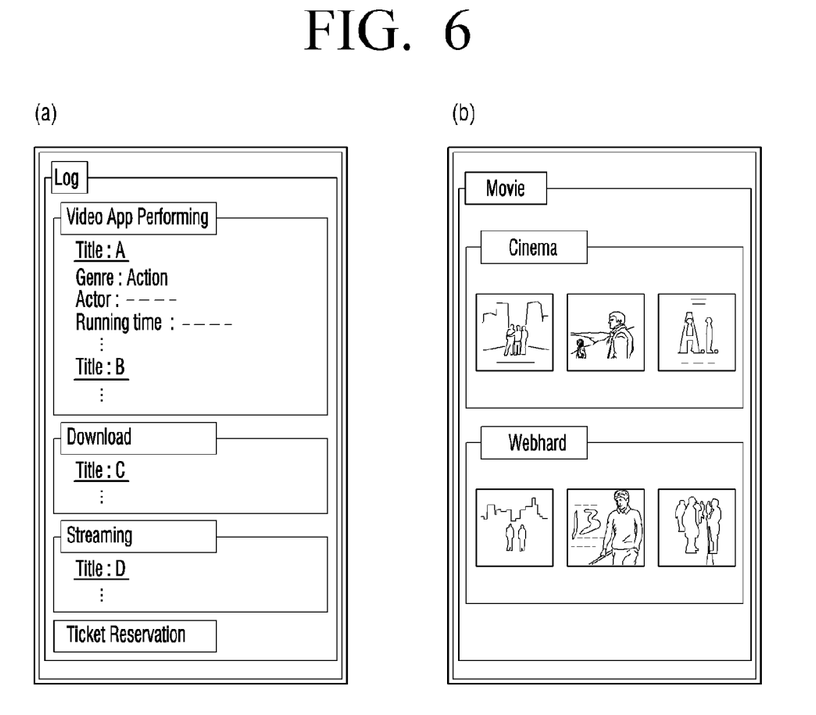
FIG. 6 is a view illustrating a screen of a user terminal apparatus in a content providing scenario according to an exemplary embodiment of the present general inventive concept.

FIG. 6 is a view illustrating a screen of the user terminal apparatus 100 in a content providing scenario according to the present general inventive concept.

In the exemplary embodiment of FIG. 6, the user terminal apparatus 100 connects to a website providing a moving image, and requests to receive a service customized to a user to the server 200. At this point, a log-in operation to the server 200 is not required by the user terminal apparatus 100 in order to receive a customized service from the server 200.

When the user terminal apparatus 100 requests to receive a service, the server 200 requests to receive use log information to the user terminal apparatus 100. As illustrated in view (a) of FIG. 6, the user terminal apparatus 100 stores information on a moving image executed by a moving image application (e.g., a title, an actor, and a running time, etc.), information on a moving image downloaded on the Internet (e.g., a title, an actor, and a running time, etc.), information on a moving image viewed through a streaming service (e.g., a title, an actor, and a running time, etc.), and information on a ticket advance sale executed through the user terminal apparatus 100 as use log information. The use log information is provided to the server 200.

The user terminal apparatus 100 may provide the server 200 with the use log information and user information selectively, and may display a selection menu so that the user is able to select information to be provided. For example, considering that the user has a habit of watching a movie of a high definition moving image file, and few movies are provided through a moving image streaming service due to a copyright issue, the user may want the user terminal apparatus 100 to not consider a streaming service use history when providing a service customized to the user. In this case, the user terminal apparatus 100 may provide only information selected by the user to the server 200.

The server 200 searches a moving image database by using the use log information as a query. As illustrated in view (b) of FIG. 6, a moving image service screen may be configured by considering a genre, an actor, a director, and a running time of a movie in which the user is interested.

Figure 7:
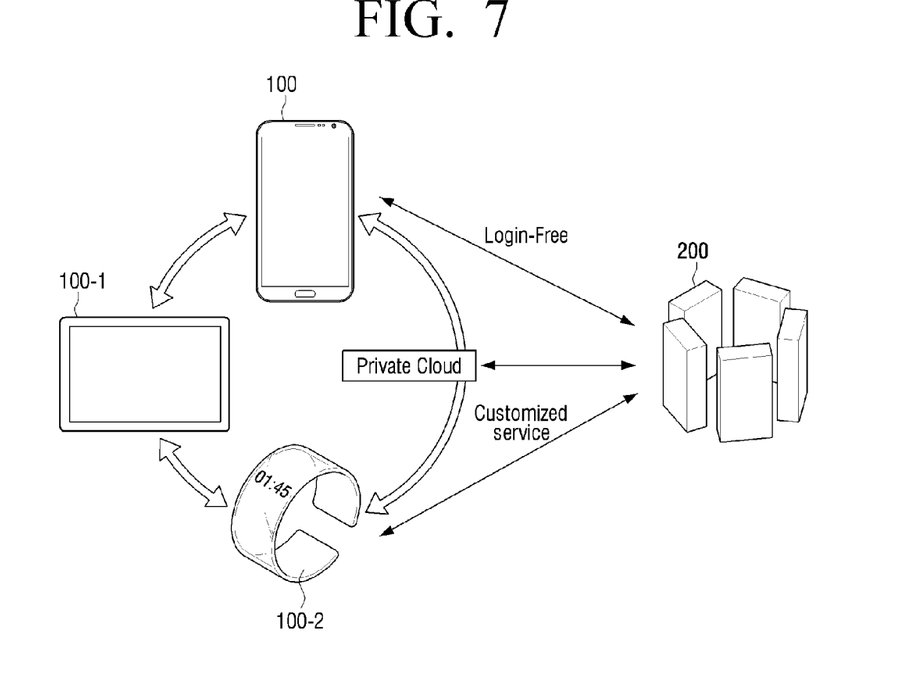
FIG. 7 is a mimetic diagram illustrating providing a customized service by using a private cloud according to an exemplary embodiment of the present general inventive concept.

A user may a plurality of mobile devices, and thus the user's interest or necessity may be not reflected accurately. Accordingly, it is required to share use log information among the plurality of mobile devices that a user owns. FIG. 7 recites such exemplary embodiment of the present general inventive concept.

That is, FIG. 7 is a mimetic diagram describing providing a customized service by using a private cloud according to an exemplary embodiment of the present general inventive concept.

In the exemplary embodiment of FIG. 7, the user terminal apparatus 100 may be one of a plurality of user terminal apparatuses included in a private cloud. The private cloud may further include other user terminal apparatuses besides the user terminal apparatus 100, such as a tablet PC 100-1 and a smart watch 100-2.

The user terminal apparatuses 100, 100-1, and 100-2 may share use log information. In this case, when a request of the server 200 is received, the user terminal apparatus 100 forwards use log information on other user terminal apparatuses 100-1 and 100-2 to the server 200 as well as use log information on the user terminal apparatus 100.

Meanwhile, the use log information owned by the user terminal apparatuses 100, 100-1, and 100-2 may be provided by each user terminal apparatus only when it is required to provide a service. That is, when a request of the server 200 is received, the user terminal apparatus 100 provides its own use log information only, and in this case, the server 200 receives use log information from each of other user terminal apparatuses 100-1 and 100-2.

The controller 220 of the server 200 controls to generate information customized to the user based on the use log information on a plurality of user terminal apparatuses 100, 100-1, and 100-2 included in the private cloud, and provide a service customized to the user by using the generated customized information.

Hereinafter, a method of providing a customized service according to various exemplary embodiments of the present general inventive concept will be described.

Figure 8:
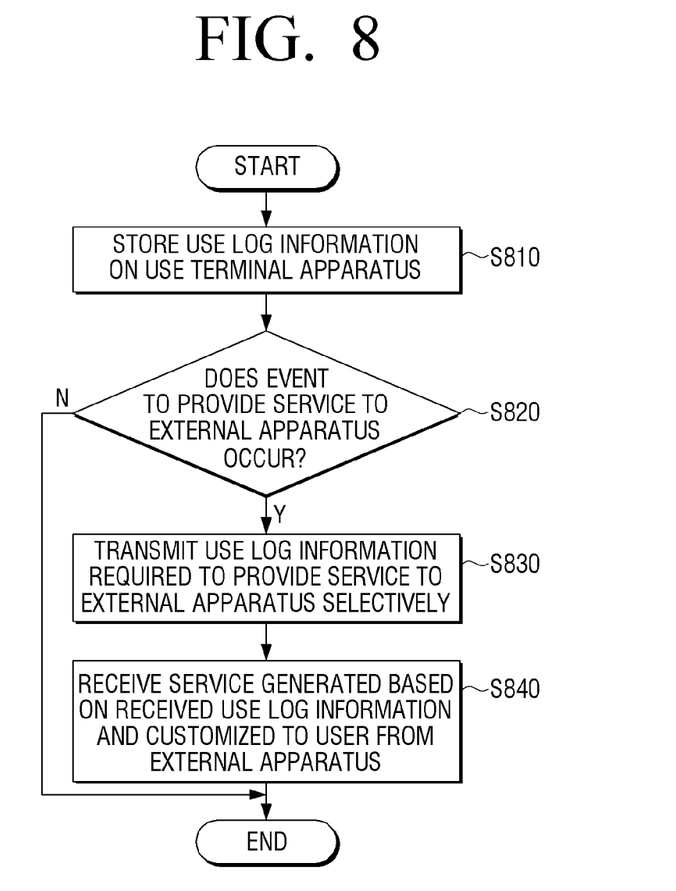
FIG. 8 through FIG. 10 are flow charts explaining a method of providing a customized service according to various exemplary embodiments of the present general inventive concept.
Figure 9:
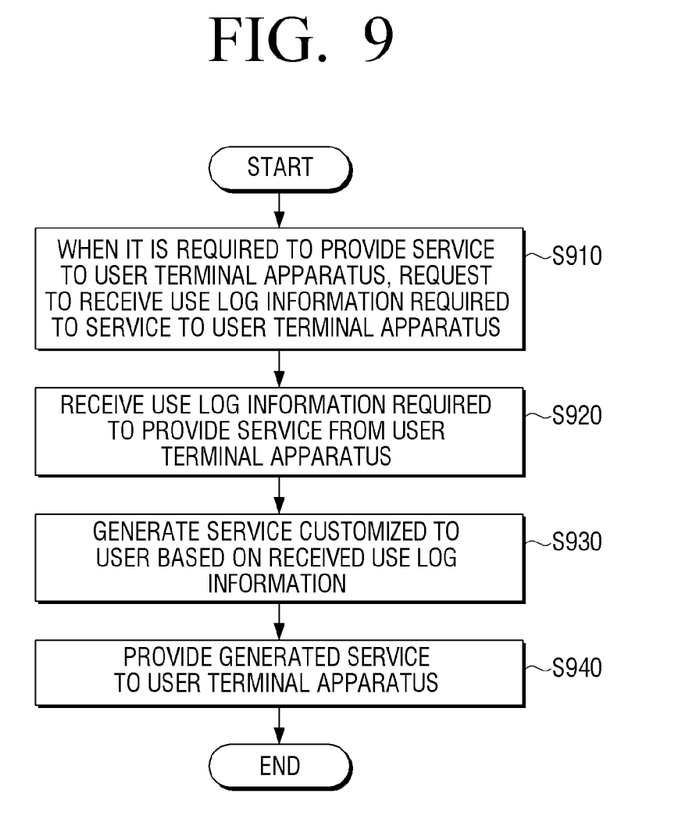
Figure 10:
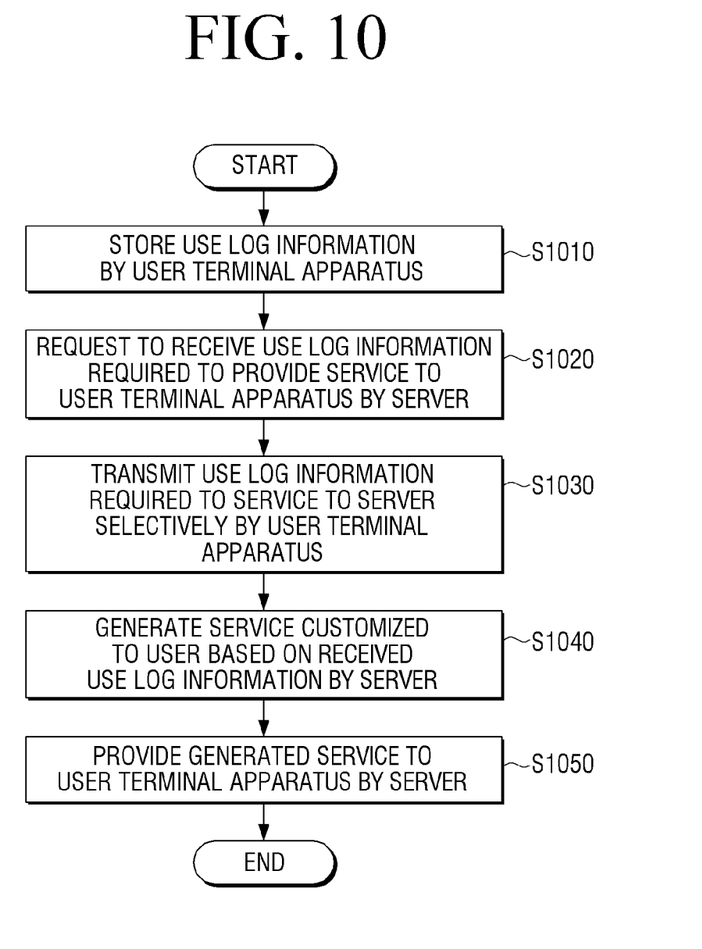

FIG. 8 through FIG. 10 are the flow charts regarding a method of providing a customized service according to various exemplary embodiments of the present general inventive concept.

Referring to FIG. 8, the method of providing a customized service according to an exemplary embodiment of the present general inventive concept includes storing use log information on a user terminal apparatus (S810), and when an event to receive a service from an external apparatus occurs (S820-Y), transmitting use log information required to provide the service to the external apparatus selectively (S830). In addition, the method includes receiving a service generated based on the transmitted use log information and customized to the user (S840).

At this point, the use log information may be at least one of web page visit history information, item select information, application use information, content download information, item purchase history information, and translocation information on the user terminal apparatus.

In addition, the transmitting the use log information to the external apparatus selectively (S830) may include, when a user input is received, transmitting use log information required to provide the service to the external apparatus selectively based on the received user input.

In addition, the aforementioned method of providing a customized service may further include transmitting user information indicating a user characteristic to the external apparatus (not depicted), and the receiving a service customized to the user (S840) may receive and output a service generated based on the provided user information and the use log information and customized to the user from the external apparatus.

In addition, the use log information may be the user's product purchase history information, and the receiving a service customized to the user (S840) may include receiving a product service generated based on the product purchase history information received from an online shopping mall and customized to the user.

Meanwhile, the use log information may be the user's content view information, and the receiving the service customized to the user (S840) may include a content providing service generated based on the content view information received from a content service server and customized to the user.

Referring to FIG. 9, the method of providing a customized service according to another exemplary embodiment includes, when it is required to provide a service to a user terminal apparatus, requesting to receive use log information to the user terminal apparatus (S910), and receiving use log information required to provide the service from the user terminal apparatus (S920). In addition, the method includes generating information customized to a user based on the received use log information (S930) and providing the service to the user terminal apparatus by using the generated customized information (S940).

The method of providing a customized service may further include receiving user information indicating user characteristic from the user terminal apparatus, and the providing a service to the user terminal apparatus (S940) may include generating information customized to a user based on the received user information and the use log information and providing a service to the user terminal apparatus by using the generated customized information.

In addition, the use log information may be the user's product purchase history information, and providing a service to the user terminal apparatus (S940) may include providing the user terminal apparatus with a product service customized to a user based on the product purchase history information.

In addition, the aforementioned method of a customized service may further include receiving user information indicating a user characteristic (not depicted), and providing a service customized to the user (S940) may include providing a service customized to the user based on the received user information and the use log information.

Referring to FIG. 10, the method of providing a customized service according to another exemplary embodiment includes storing use log information by the user terminal apparatus (S1010), and requesting to receive use log information required to provide a service to the user terminal apparatus by the server (S1020). In addition, the user terminal apparatus transmits use log information required to provide a service to the server selectively (S1030). The server generates information customized to the user based on the received use log information (S1040), and provides a service to the user terminal apparatus by using the generated customized information (S1050).

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

The aforementioned method of providing a customized service may be embedded and provided in a hardware IC chip in a form of embedded software, and may be included in the aforementioned user terminal apparatus 100 and the server 200 as a configuration thereof.

According to the aforementioned various exemplary embodiments, the present general inventive concept is capable of providing a service customized to a user on a user terminal apparatus conveniently without a log-in operation while reducing the risk of privacy invasion.

As given above, although a few desirable exemplary embodiments have been shown and described, the present disclosure is not limited to the aforementioned particular exemplary embodiments, and could be variously modified and achieved by those skilled in the art to which the present disclosure pertains without deviating from the substance of the present disclosure which is claimed in the claims, and such modifications should not be understood separately from the technical concept or prospect of the present disclosure.

What is claimed is:

1. A user terminal apparatus, comprising:
a storage to store use log information on the user terminal apparatus; and
at least one hardware processor configured to
set grades of the use log information according to degrees of possibility of privacy invasion,
display, when an event to receive a service from an external apparatus occurs, a selection menu to select content from the use log information to be provided to the external apparatus based on the grades, and
cause the user terminal apparatus to perform
transmitting, to the external apparatus, a selected portion of all contents in the use log information selected by a user and selected using the selection menu, when an input to permit the selected portion of all contents in the use log information to be provided to the external apparatus is received, and
receiving the service generated based on the transmitted portion of all contents in the use log information and customized to the user from the external apparatus.

2. The apparatus as claimed in claim 1, wherein the portion of all contents in the use log information transmitted to the external apparatus is at least one of web page visit history information, item select information, application use information, content download information, item purchase history information, and translocation information on the user terminal apparatus.

3. The apparatus as claimed in claim 1, wherein
the at least one hardware processor is configured to cause transmitting user information indicating user characteristic to the external apparatus,
the service received is generated based on the transmitted user information and the use log information and is customized to the user, and the at least one hardware processor is configured to cause output of the service upon the receiving the service.

4. The apparatus as claimed in claim 1, wherein
the portion of all contents in the use log information transmitted to the external apparatus is a user's product purchase history information, and
the service is a product service generated based on the product purchase history information and customized to the user from an on-line shopping mall.

5. The apparatus as claimed in claim 1, wherein
the portion of all contents in the use log information transmitted to the external apparatus is a user's content view information, and
the service is a content providing service generated based on the content view information and customized to the user from a content service server.

6. The user terminal apparatus of claim 1, wherein the at least one hardware processor is configured to set different respective grades for different content in the use log information, the respective grades corresponding to different respective degrees of possibility of privacy invasion.

7. A method of providing a customized service, comprising:
storing use log information of a user on a user terminal apparatus;
setting grades of the use log information according to degrees of possibility of privacy invasion;
when an event to receive a service from an external apparatus occurs,
display a selection menu to select content from the use log information to be provided to the external apparatus based on the grades, and
transmitting, to the external apparatus, a selected portion of all contents in the use log information selected by the user and selected using the selection menu, when an input to permit the selected portion of all contents in the use log information to be provided to the external apparatus is received by the user terminal apparatus; and
receiving, from the external apparatus, the service generated based on the transmitted portion of all contents in the use log information and customized to the user.

8. The method as claimed in claim 7, wherein the selected portion of all contents in the use log information is at least one of web page visit history information, item select information, application use information, content download information, item purchase history information, and trans-location information on the user terminal apparatus.

9. The method as claimed in claim 7, further comprising:
transmitting user information indicating user characteristic to the external apparatus, and
outputting the service received in the receiving the service,
wherein in the receiving the service, the service received is generated based on the provided user information and the transmitted portion of all contents in the use log information and is customized to the user.

10. The method as claimed in claim 7, wherein
the transmitted portion of all contents in the use log information is a user's product purchase history information, and
in the receiving the service customized to the user, the service received is a product service generated based on the product purchase history information and customized to the user and is received from an on-line shopping mall.

11. The method as claimed in claim 7, wherein
the transmitted portion of all contents in the use log information is a user's content view information, and
in the receiving the service customized to the user, the service received is a service generated based on the content view information and customized to the user and is received from a content service server.

12. A method of providing a customized service, comprising:
storing use log information by a user terminal apparatus;
setting grades of the use log information according to degrees of possibility of privacy invasion;
when a request to transmit at least a part of the use log information is received from a server,
display a selection menu to select content from the use log information to be provided to the external apparatus based on the grades, and
transmitting, to the server by the user terminal apparatus, a selected portion of all contents in the use log information selected by the user and selected using the selection menu, when an input to permit the selected portion of all contents in the use log information to be provided to the server is received by the user terminal apparatus;
generating information customized to a user based on the portion of all contents in the use log information transmitted to the server; and
providing the service to the user terminal apparatus using the generated customized information by the server.

* * * * *